United States Patent
Ichihara

(10) Patent No.: US 6,229,840 B1
(45) Date of Patent: May 8, 2001

(54) DIVERSITY CIRCUIT

(75) Inventor: Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/034,331

(22) Filed: Mar. 4, 1998

(30) Foreign Application Priority Data

Mar. 4, 1997 (JP) .................................................. 9-048685

(51) Int. Cl.[7] .............................. A61F 2/06; H04L 27/30
(52) U.S. Cl. .......................................................... 375/147
(58) Field of Search ................................... 375/267, 259, 375/260, 346, 347, 349, 130, 140, 148, 144, 147

(56) References Cited

U.S. PATENT DOCUMENTS

| 5,335,251 | * | 8/1994 | Onishi et al. . | |
| 5,671,221 | * | 9/1997 | Yang | 370/320 |
| 5,787,122 | * | 7/1998 | Suzuki | 375/267 |
| 5,859,870 | * | 1/1999 | Tsujimoto | 375/200 |

FOREIGN PATENT DOCUMENTS

| 4-40713 | 2/1992 | (JP) . |
| 4-185130 | 7/1992 | (JP) . |
| 6-69841 | 3/1994 | (JP) . |
| 6-169273 | 6/1994 | (JP) . |
| 6-284054 | 10/1994 | (JP) . |
| 7-87057 | 3/1995 | (JP) . |
| 7-231278 | 8/1995 | (JP) . |
| 7-250014 | 9/1995 | (JP) . |
| 8-265244 | 10/1996 | (JP) . |
| 96/08088 | 3/1914 | (WO) . |
| 96/00991 | 1/1996 | (WO) . |
| 97/24818 | 7/1997 | (WO) . |

OTHER PUBLICATIONS

Oguchi Takuro, Space Diversity System, Patent Abstracts of Japan, vol. 005, No. 030 (E–047), 2/81 & JP 55 156433 (Fujitsu Ltd)., 12/80.

K. Fujimoto et al., "Mobile Antenna Systems Handbook", 1994, p. 78–85.

A. J. Viterbi., "CDMA–Principles of Spread Spectrum Communication", Addison–Wesley Wireless Communication Series, Jun. 1995, p. 87–96.

D. P. Whipple, "North American Cellular CDMA", Hewlett–Packard Journal, Dec. 1993, p. 90–97.

* cited by examiner

Primary Examiner—Chi Pham
Assistant Examiner—Jean B. Corrielus
(74) Attorney, Agent, or Firm—Foley & Lardner

(57) ABSTRACT

Radio-frequency signals received by two antennas are respectively amplified by two amplifiers. Of the two signals, only the radio-frequency signal received by the second antenna is delayed by a delay time T through a delay circuit. The output from the delay circuit and the output from the first amplifier connected to the first antenna are combined by a combiner. From this stage toward subsequent stages, a shared receiver lowers the frequency of the combined signal to that of a base band signal, which is converted into a digital signal by a shared A/D converter. This digital signal is demodulated by a Rake receiver, and the demodulated result is decoded by the decoder to reproduce transmitted data.

34 Claims, 6 Drawing Sheets

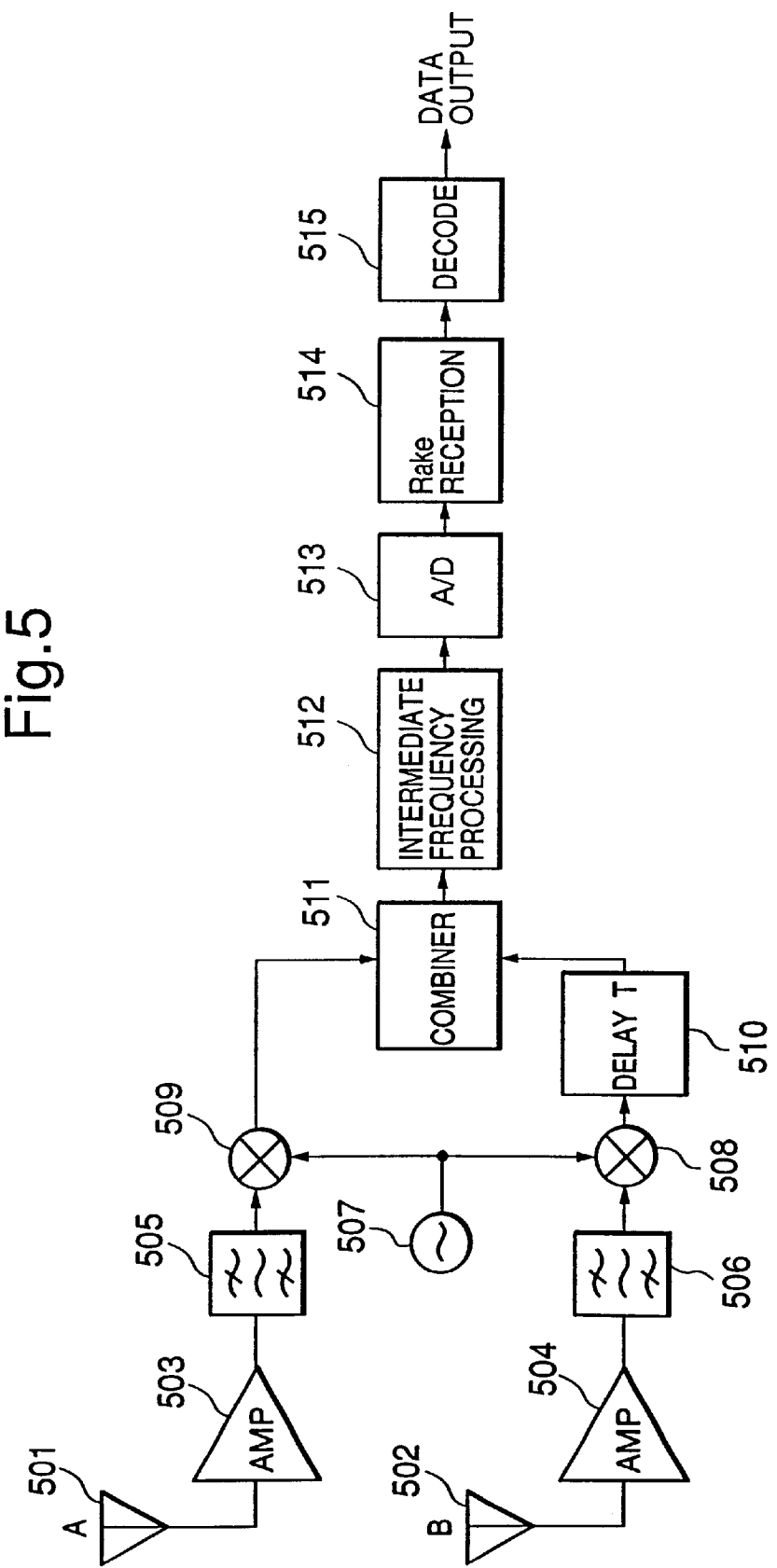

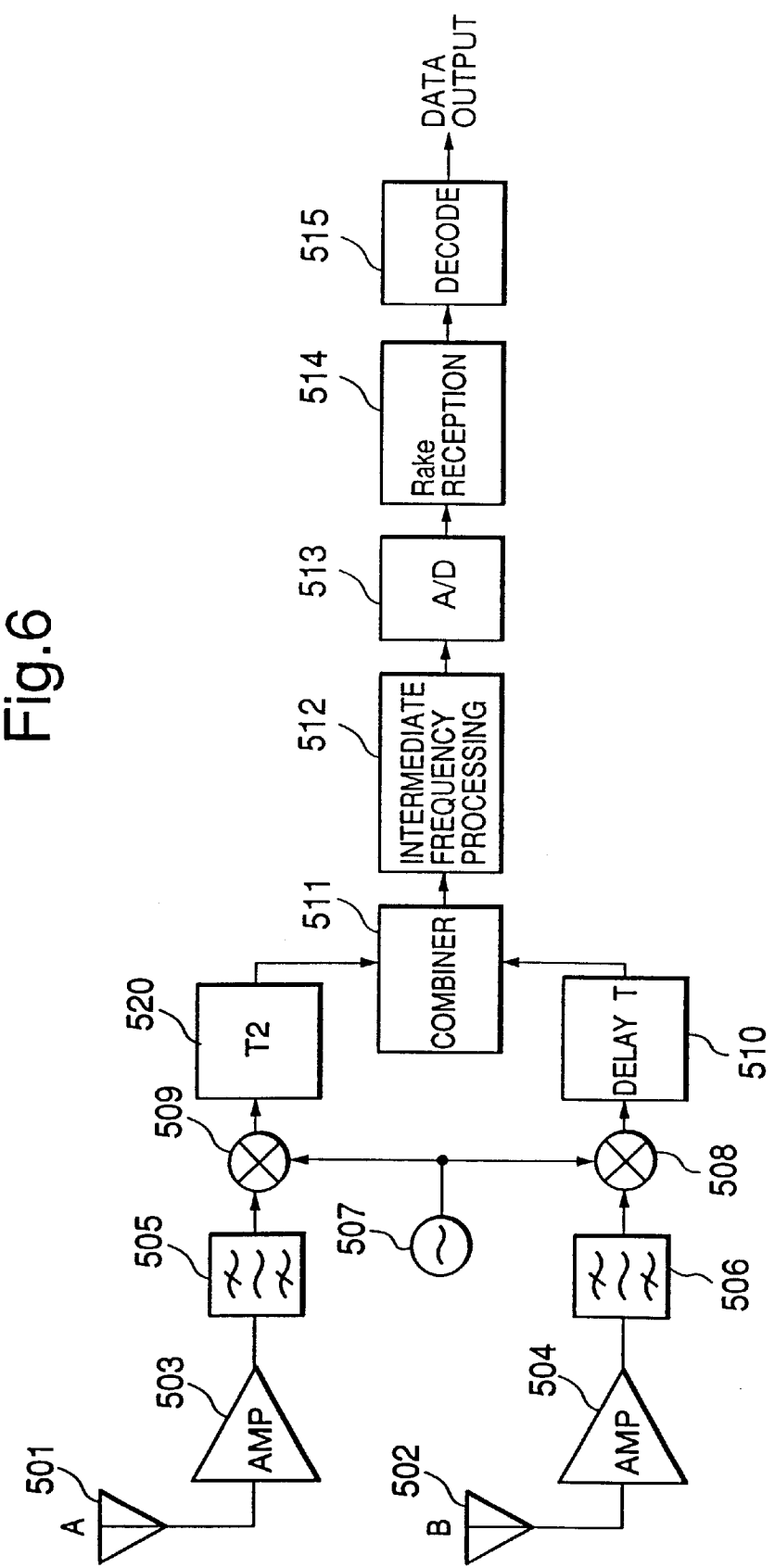

DIVERSITY CIRCUIT

BACKGROUND OF THE INVENTION

1. Field of the Invention

The present invention relates to a diversity circuit, more specifically to a diversity circuit for antenna diversity of a radio communication system employing a spread spectrum system, such as code division multiple access (CDMA).

2. Description of the Related Art

In a conventional combining diversity circuit, a set of an antenna, receiver, and demodulator is needed for each of the diversity paths. Signals from each diversity path are combined at a final stage of signal processing by using the maximal ratio combining technique, where finally the signals from each diversity path are combined into one composite signal.

FIG. 2 illustrates an example of the foregoing conventional circuit. FIG. 2 is a typical example of an antenna combining diversity circuit. Signals received by each of two antennas 201, 202 are respectively demodulated into base band signals by receivers 203, 204. The demodulated outputs of receivers 203, 204 are respectively converted into digital signals by A/D converters 205, 206. The digitally converted signals are respectively demodulated by digital demodulators 207, 208, where finally the two demodulated signals are added, or combined by a combiner 209. The output from the combiner 209 is decoded by a decoder 210 to reproduce transmitted data.

In the conventional combining diversity circuit having dual branches, a set of an antenna, receiver, A/D converter and digital demodulator is needed for each of the two diversity paths, which doubles the scale of the circuit compared to a case without applying the diversity. Naturally, increased scale of the circuit will increase the power consumption, cost, and size of the unit, which makes it difficult to use the diversity circuit for a portable telephone, for example.

SUMMARY OF THE INVENTION

It is therefore an object of the present invention to provide a diversity circuit in which the scale of circuit is reduced, and thereby the size, power consumption, and cost of the unit can be reduced.

In order to accomplish the foregoing object and other objects, a diversity circuit for receiving a spread spectrum modulated wave signal according to the invention includes a plurality of antennas, a plurality of delay circuits that each give different delay times to a plurality of radio-frequency signals received by a plurality of the antennas, combining means for adding outputs of a plurality of the delay circuits, demodulation means for demodulating an output from the combining means, A/D conversion means for converting a demodulated result by the demodulation means into a digital signal, and digital signal processing means for processing an output from the A/D conversion means to decode.

In the foregoing diversity circuit, the signals received by a plurality of the antennas may be amplified by a plurality of amplifiers, and thereafter passed through the delay circuits, or, further converted into signals of intermediate frequencies by frequency conversion means, passed through the delay circuits, and thereafter combined and demodulated.

Further, in case of two antennas, only one delay circuit is needed, and the diversity circuit may be formed such that a radio-frequency wave signal received by one antenna is not processed as it is and only the signal received by the other one antenna is delayed by the delay circuit, and thereafter the two signals are combined.

Further, in the diversity circuit, the digital signal processing means may apply a Rake reception system that gives de-spreading codes to each of signals having different delay times and combines the results, and a combined result may be decoded by decode means.

Preferably, differences in the delay times of the delay circuits are sufficiently larger than differences in transmission times by multipaths produced on separate transmission paths.

In the spread spectrum communication system according to the invention, it is possible to lower the correlation between signals shifted in time base and de-spreading codes by properly selecting spreading codes. Therefore, the signals shifted in time base can be identified as signals passed through different communication lines, and can be separated as such. The present invention exploits the foregoing theory.

BRIEF DESCRIPTION OF THE DRAWINGS

The above-mentioned objects and advantages of the invention will become more apparent from the following detailed description when read in conjunction with the accompanying drawings, with like reference numerals indicating corresponding parts throughout, and wherein:

FIG. 5 is a block diagram of a second embodiment of the present invention; and

FIG. 6 is a block diagram of a third embodiment of the present invention.

DETAILED DESCRIPTION OF THE PREFERRED EMBODIMENTS

The invention will hereafter be described with reference to the accompanying drawings.

In the system according to the invention, one of the signals received by two antennas is shifted in time base with respect to the other one by a delay circuit, and both the time-shifted signal and the non-time-shifted signal are added or combined by a combiner at an earlier stage in the receiver. After being combined, both signals pass through a shared demodulator and A/D converter, and then enter a Rake receiver to demodulate the signals. In this manner, the invention can reduce the number of demodulators and A/D converters in the diversity system from two to one, and thereby reduce the scale of circuit.

Figure 1:
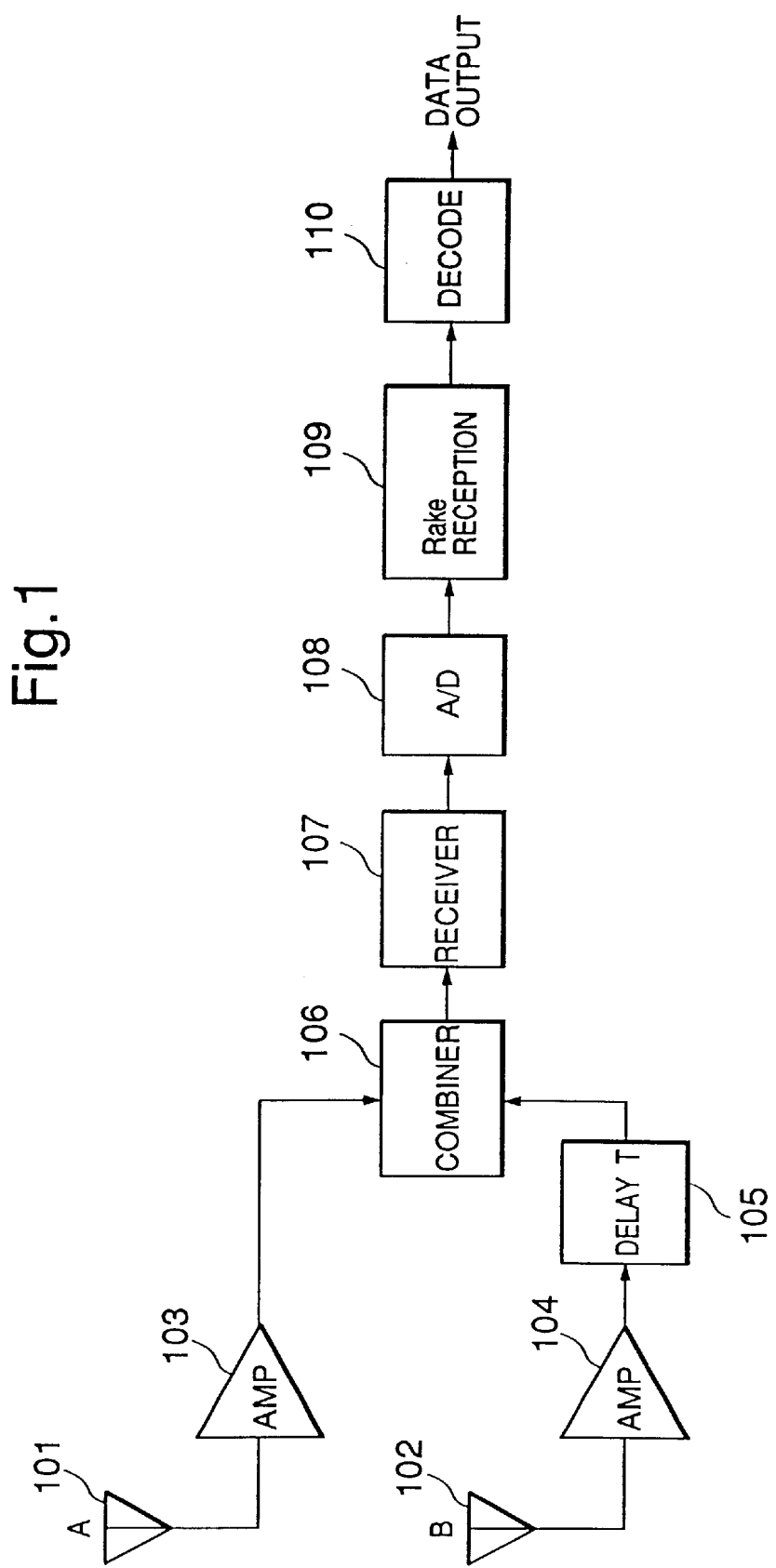
FIG. 1 is a block diagram of a first embodiment of the present invention.
Figure 2:
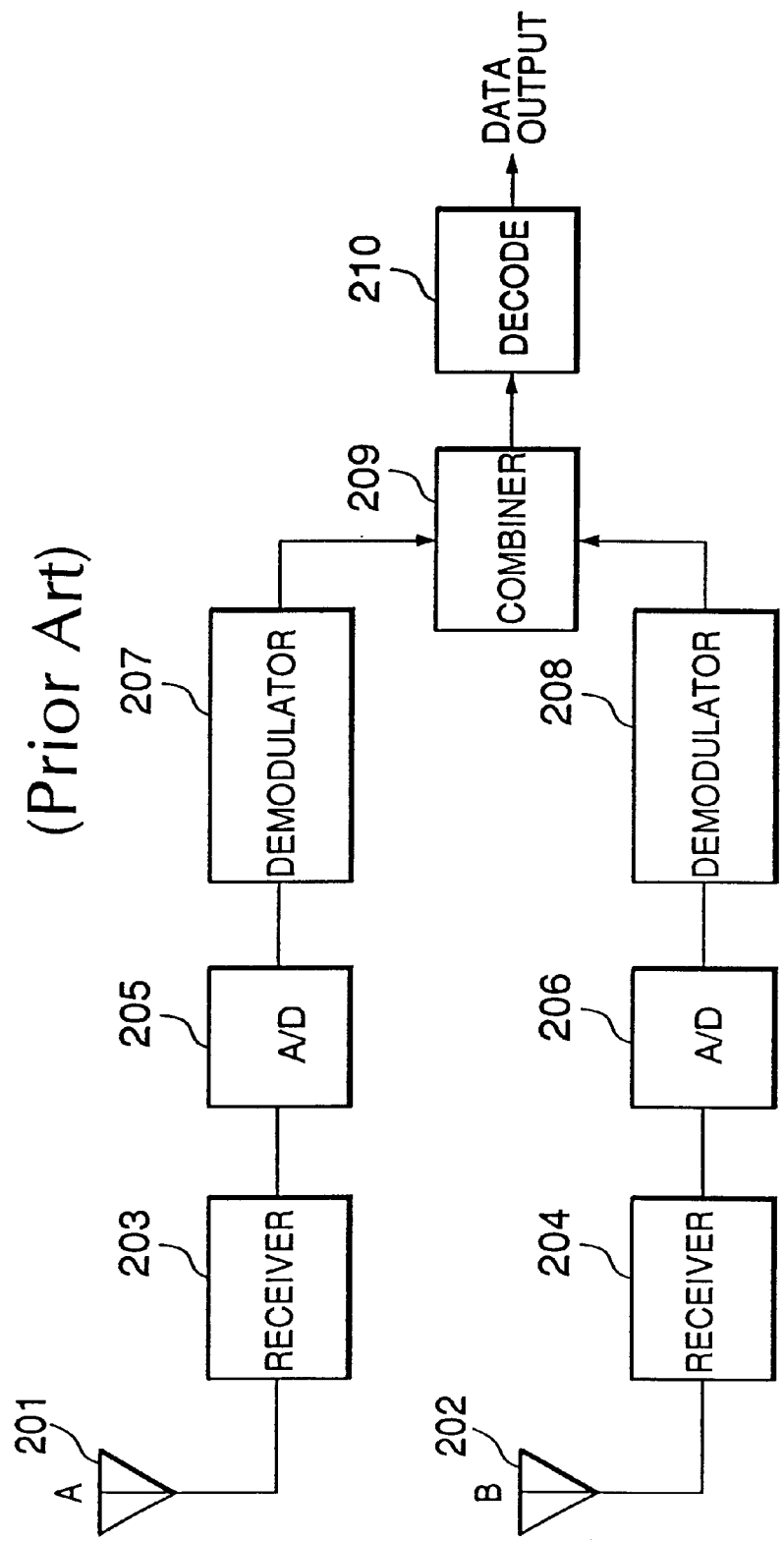
FIG. 2 is a block diagram of a conventional diversity system.

FIG. 1 is a block diagram of a first embodiment of the present invention. Radio-frequency signals received by antennas 101, 102 are amplified by amplifiers 103, 104. Of the two signals, only the radio-frequency signal received by the antenna 102 is delayed by a delay time T through a delay circuit 105 (hereafter, this route is called "path B"). Delay circuit 105 may be implemented as an additional line length to achieve an appropriate delay, for example. The output from the delay circuit 105 and the output from the amplifier 103 (hereafter, this route is called "path A") is combined at a combiner 106. From this stage toward the subsequent stage, a shared receiver 107 lowers the frequency of the combined signal to that of a base band signal, which is converted into a digital signal by a shared A/D converter 108. A Rake receiver 109 demodulates the digital signal, and a decoder 110 decodes the demodulated result to reproduce transmitted data. Rake receivers are described in detail in Section 4.4 of "CDMA—Principles of Spread Spectrum Communication", by Andrew J. Viterbi, published June, 1995, which is incorporated herein by reference.

Figure 3:
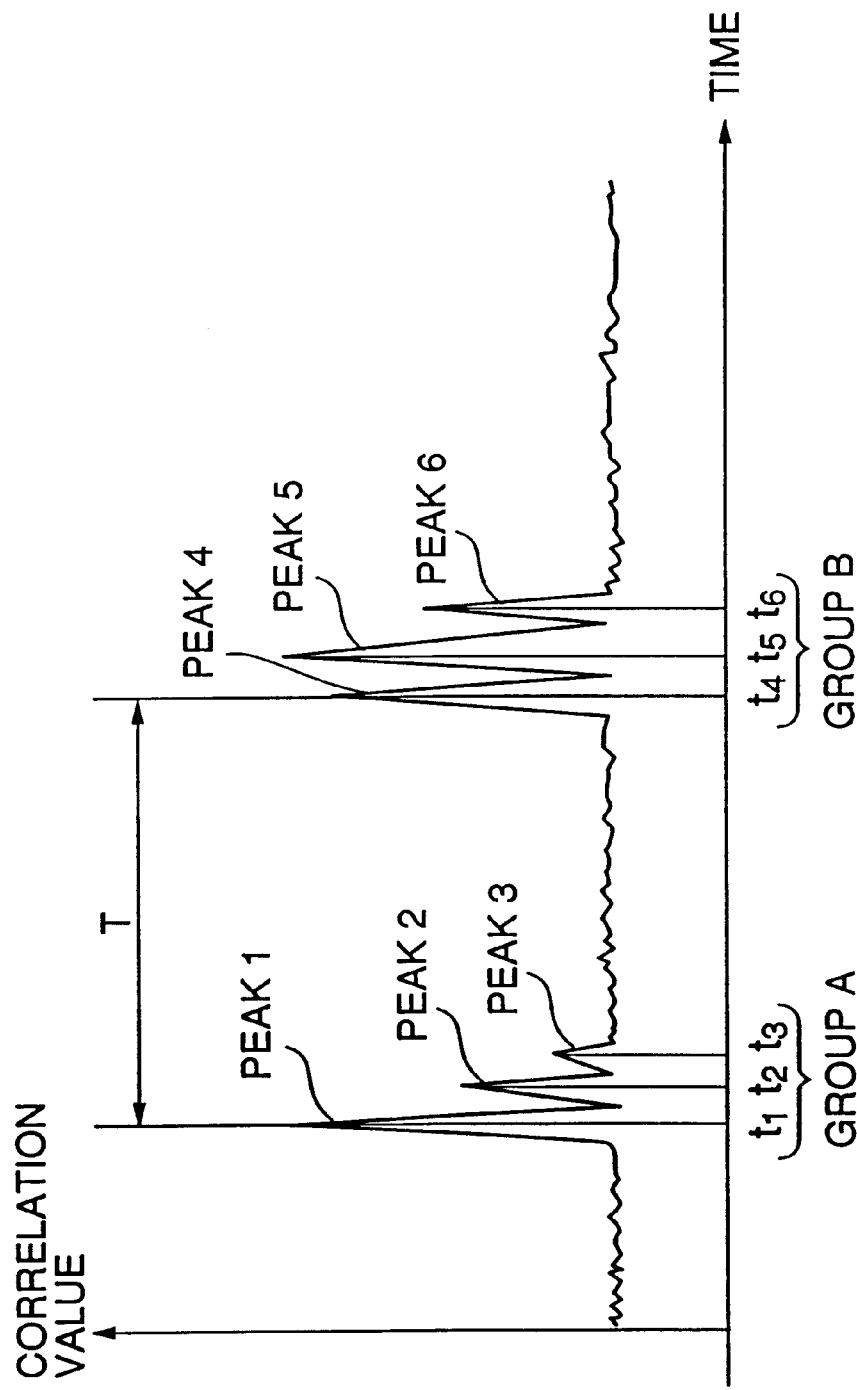
FIG. 3 is a chart showing a delay profile.
Figure 4:
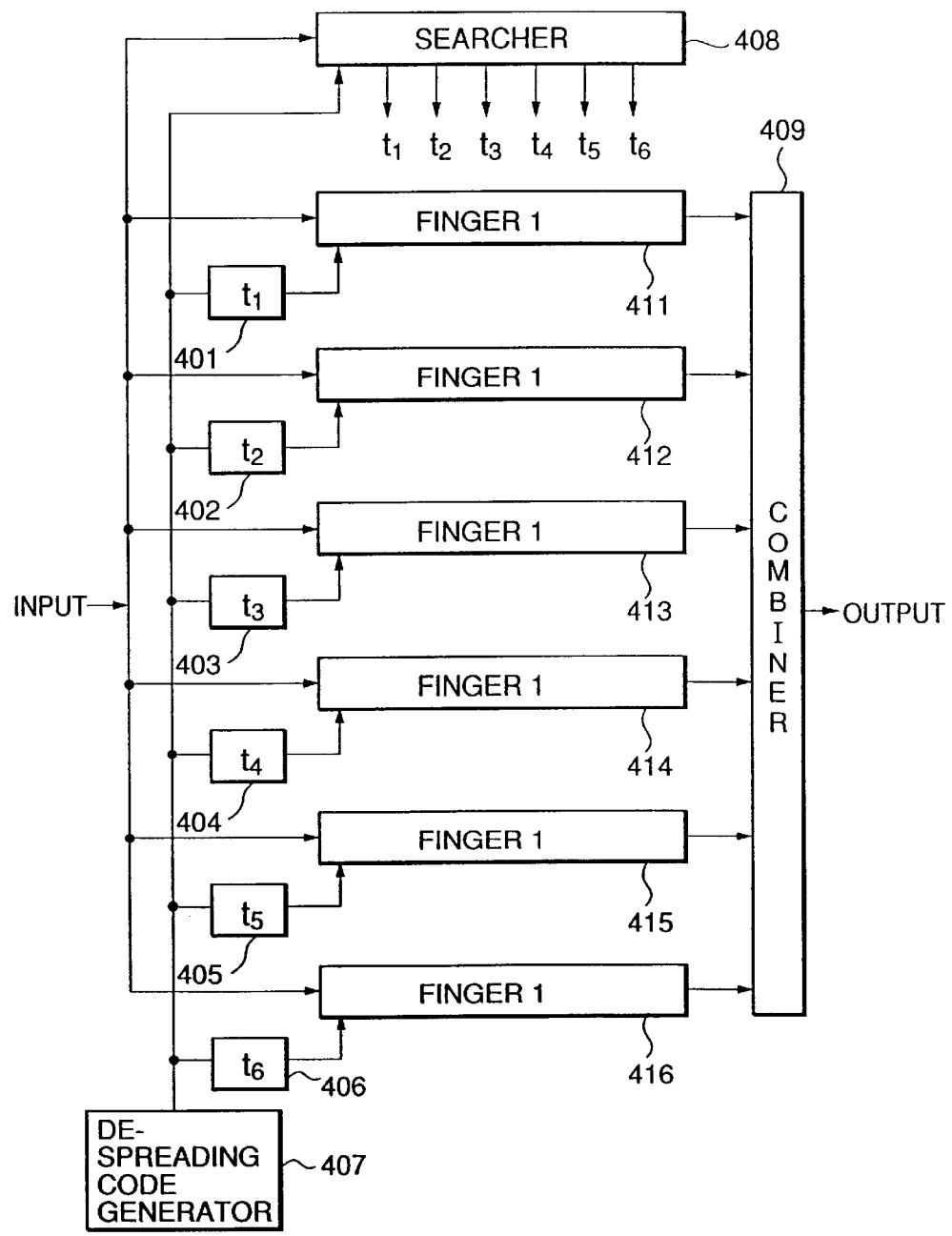
FIG. 4 is a block diagram of a Rake receiver according to the present invention.

The Rake receiver 109 according to the present invention takes on a configuration, for example, as shown in FIG. 4. A search correlator 408 gradually shifts the phase of a de-spreading code generated by de-spreading code generator 407 to calculate a correlation between the input signal and the de-spreading code. As a result, a delay profile (a graph showing the correlative value against the delay time in relation to de-spreading code) is acquired as shown in FIG. 3. The group A in FIG. 3 represents signals received through the path A, and the group B represents signals received through the path B. The peaks 2, 3 of the group A are delay components produced by multipaths on the transmission line of the peak 1, and the peaks 5, 6 of the group B are delay components produced by multipaths on the transmission line of the peak 4. The group B is delayed by a time T to the group A by the delay circuit 105. If the value of T is sufficiently large, such that the group A and the group B are not overlapped, the peaks of the groups can be separated as individual components that have the delay times of t1, t2, . . . , t6. The search correlator 408 sets the values of t1, t2, . . . , t6 to delay circuits 401, . . . 406 as delays of the de-spreading codes inputted to finger receivers 411, . . . , 416. The finger receivers 411, . . . , 416 respectively calculate the correlative values of the peak levels at the delay time t1, t2, . . . , t6, which are contained in each of the input signals. A combiner 409 applies a weighting to the calculated correlative values to thereby perform the Maximal Ratio Combining.

In this manner, the signals of the two paths A and B are maximum-peak-ratio-combined equivalently to the conventional combining diversity circuit having two separate diversity paths, and thereafter decoded by the decoder 110.

FIG. 5 illustrates a second embodiment different from the first embodiment shown in FIG. 1, which, however, differs only in that a delay circuit 510 is located after a mixer 508, and is theoretically the same as FIG. 1. In this case, a mixer (or frequency converter) 508, 509 and a filter 505, 506 are provide in each path, and a tunable local oscillator 507 is provided as an input to the mixers 508, 509. IF processing element 512 provides filtering, amplifying and automatic gain control (AGC). In the second embodiment, the delay circuit 510 can be composed more easily using a SAW device, etc., which is advantageous. Thus, a smaller-sized delay circuit than one used in the first embodiment may be realized.

FIG. 6 illustrates a third embodiment of the present invention. The third embodiment is similar to the second embodiment, but differs in that delay circuits, shown as SAW filters 510, 520, are provided in each path. In the third embodiment, the difference in delays between the SAW filters 510, 520 is such that a delay profile similar to that shown in FIG. 3 is realized. That is, SAW filter 510 is provided with a different delay than SAW filter 520.

As described above, the present invention will reduce the scale of a combining diversity circuit employing a plurality of antennas, and be able to reduce the size, power consumption, and cost of the unit.

Further, while the present invention has been described with respect to spread spectrum modulated wave signals being received by a plurality of antennas, other types of diversity reception, such as polarization diversity or frequency diversity, may be utilized while remaining within the teachings of the present invention. If frequency diversity is used, then a separate local oscillator needs to be provided in each diversity path (e.g., in FIG. 5, local oscillator 507 replaced by two local oscillators respectively provided to mixer 508, 509).

While preferred embodiments have been described herein, modification of the described embodiments may become apparent to those of ordinary skill in the art, following the teachings of the invention, without departing from the scope of the invention as set forth in the appended claims. For example, other types of filters other than Rake filters, such as adaptive digital filters, may be utilized while remaining within the teachings of the invention. Also, while the above-described embodiments are shown with respect to an antenna provided for in each diversity path, one of ordinary skill in the art will recognize that the invention may also be implemented with a single antenna that receives an input signal and provides separate diversity signals (e.g., frequency or polarization diversity signals) on separate output ports of the antenna.

What is claimed is:

1. A diversity circuit for receiving a spread spectrum modulated wave signal, the diversity circuit comprising:

a plurality of antennas;

a plurality of delay circuits that are respectively configured to provide different delay times to a plurality of radio-frequency signals received by the plurality of the antennas;

a combiner configured to add outputs of the plurality of the delay circuits and to provide a combined output;

a receiver connected to demodulate the combined output and to provide a demodulated output; and a digital signal processor configured to process the demodulated output by using a Rake receiver wherein the Rake receiver provides a delayed de-spreading code to each of signals having the different delay times provided by the plurality of delay circuits and combines the results so as to provide a decoded output, wherein the Rake receiver includes:

a plurality of delay elements each having a different delay amount corresponding to a respective delay time value provided thereto;

a de-spreader code generator that outputs a de-spreading code;

a search correlator that receives the de-spreading code output by the de-spreading code generator and that receives the demodulated output, the search correlator configured to shift a phase of the de-spreading code to calculate a correlation between each of the signals and the de-spreading code, the search correlator outputting the respective delay time values to the plurality of delay elements;

a plurality of finger receivers that receive the demodulated output and that receive the de-spreading code respectively delayed by a corresponding one of the plurality of delay elements; and a combiner configured to combine outputs of the plurality of finger receivers into a single output signal, wherein first time values which correspond to time differences between the respective delay time values of the plurality of delay elements of the Rake receiver, are each less than second time values which correspond to time differences between the respective delay times of the plurality of delay circuits.

2. A diversity circuit as claimed in claim 1, wherein the signals received by the plurality of the antennas are respectively amplified by a plurality of amplifiers, and thereafter respectively passed through the delay circuits.

3. A diversity circuit as claimed in claim 1, wherein the signals received by the plurality of antennas are respectively amplified by a plurality of amplifiers, thereafter respectively converted into signals of intermediate frequencies by a plurality of frequency converters, respectively passed through the delay circuits having different delay times, and thereafter synthesized and demodulated.

4. A diversity circuit as claimed in claim 1, wherein a number corresponding to the plurality of antennas is two, a radio-frequency wave signal received by one antenna is not delayed and only the radio-frequency wave signal received by the other antenna is delayed by the corresponding delay circuit of the other antenna, and thereafter the two signals are combined.

5. A diversity circuit as claimed in claim 2, wherein a number corresponding to the plurality of antennas is two, a radio-frequency wave signal received by one antenna is not delayed and only the radio-frequency wave signal received by the other antenna is delayed by the corresponding delay circuit of the other antenna, and thereafter the two signals are combined.

6. A diversity circuit as claimed in claim 3, wherein a number corresponding to the plurality of antennas is two, a radio-frequency wave signal received by one antenna is not delayed and only the radio-frequency wave signal received by the other antenna is delayed by the corresponding delay circuit of the other antenna, and thereafter the two signals are combined.

7. A diversity circuit as claimed in claim 1, wherein the digital signal processor applies a Rake reception system that gives a de-spreading code to each of signals having different delay times and combines the results, and the combined results is decoded by a decoder.

8. A diversity circuit as claimed in claim 2, wherein the digital signal processor applies a Rake reception system that gives a de-spreading code to each of signals having different delay times and combines the results, and the combined results is decoded by a decoder.

9. A diversity circuit as claimed in claim 3, wherein the digital signal processor applies a Rake reception system that gives a de-spreading code to each of signals having different delay times and combines the results, and the combined results is decoded by a decoder.

10. A diversity circuit as claimed in claim 4, wherein the digital signal processor applies a Rake reception system that gives a de-spreading code to each of signals having different delay times and combines the results, and the combined results is decoded by a decoder.

11. A diversity circuit as claimed in claim 5, wherein the digital signal processor applies a Rake reception system that gives a de-spreading code to each of signals having different delay times and combines the results, and the combined results is decoded by a decoder.

12. A diversity circuit as claimed in claim 6, wherein the digital signal processor applies a Rake reception system that gives a de-spreading code to each of signals having different delay times and combines the results, and the combined results is decoded by a decoder.

13. A diversity circuit as claimed in claim 1, wherein differences in the delay times of the plurality of the delay circuits are sufficiently larger than differences in transmission times by multipaths produced on transmission lines.

14. A diversity circuit as claimed in claim 1, further comprising an A/D converter configured to convert the demodulated output of the receiver into a digital signal, the digital signal being provided to the digital signal processor.

15. A diversity circuit as claimed in claim 2, wherein differences in the delay times of the plurality of the delay circuits are sufficiently larger than differences in transmission times by multipaths produced on transmission lines.

16. A diversity circuit as claimed in claim 1, wherein the combiner of the Rake receiver applies a weighting to the outputs of the plurality of finger receivers to provide a maximal-ratio-combined output.

17. A diversity circuit as claimed in claim 1, wherein the delay times of the plurality of delay circuits are sufficiently large with respect to the delay time values of the plurality of delay elements such that a first plurality of signals received from one of the plurality of antennas due to multi-path, are not overlapped with a second plurality of signals received from another of the plurality of antennas due to multi-path.

18. A diversity circuit as claimed in claim 1, wherein the search correlator outputs a first plurality of delay time values to the plurality of delay elements with respect to a first received signal and outputs a second plurality of delay time values to the plurality of delay elements with respect to a delayed signal, and wherein the first plurality of delay time values are different from the second plurality of delay time values.

19. A diversity circuit, comprising:

a first antenna configured to receive a radio frequency signal and to output a first received signal;

a second antenna configured to received the radio frequency signal and to output a second received signal;

a delay circuit configured to delay the second received signal by a predetermined time value and to provide a delayed signal as a result thereof;

a combiner configured to add the first received signal to the delayed signal and to provide a composite signal as a result thereof;

a receiver configured to demodulate the composite signal to provide a demodulated signal as a result thereof; and a Rake receiver that receives the demodulated signal, wherein the Rake receiver comprises:

a de-spreading code generator that outputs a de-spreading code;

a search correlator that receives the de-spreading code and the demodulated signal, and that calculates a correlation value between each of the first received signal and the delayed signal and the de-spreading code to output a plurality of delay time values according to the correlation value calculated for each of the first received signal and the delayed signal;

a plurality of delay elements that receive a corresponding one of the plurality of delay time values respectively and that receive the de-spreading code, each of the plurality of delay elements outputting the de-spreading code with the corresponding one of the plurality of delay time values;

a plurality of finger receivers that receive the demodulated signal and the de-spreading code with the corresponding one of the plurality of delay time values respectively; and a combiner configured to combine outputs of the plurality of finger receivers into a single output signal, wherein time values which correspond to time differences between the respective delay time values of the plurality of delay elements of the Rake receiver, are each less than the predetermined time value of the delay circuit.

20. A diversity circuit as claimed in claim 19, wherein the first antenna is tuned to a first frequency range and the second antenna is tuned to a second frequency range.

21. A diversity circuit as claimed in claim 19, wherein the first antenna is configured to receive signals having a first polarity and the second antenna is configured to receive signals having a second polarity.

22. A diversity circuit as claimed in claim 19, further comprising an A/D converter configured to convert the demodulated signal output by the receiver into a digital signal, the digital signal being provided to the Rake receiver.

23. A diversity circuit as claimed in claim 19, wherein the combiner of the Rake receiver applies a weighting to the outputs of the plurality of finger receivers to provide a maximal-ratio-combined output.

24. A diversity circuit as claimed in claim 19, wherein the predetermined time value of the delay circuit is set such that a first plurality of peaks of the correlation between the first received signal and the de-spreading code due to multi-path delay, are not overlapped with a second plurality of peaks of the correlation between the delayed signal and the de-spreading code due to multi-path delay.

25. A diversity circuit as claimed in claim 19, wherein the search correlator outputs a first plurality of delay time values to the plurality of delay elements with respect to the first received signal and outputs a second plurality of delay time values to the plurality of delay elements with respect to the delayed signal, and wherein the first plurality of delay time values are different from the second plurality of delay time values.

26. A diversity circuit, comprising:
a first antenna configured to receive a radio frequency signal and to output a first received signal;
a second antenna configured to received the radio frequency signal and to output a second received signal;
a delay circuit configured to delay the second received signal by a predetermined time value and to provide a delayed signal as a result thereof;
a combiner configured to combine the first received signal with the delayed signal and to provide a composite signal as a result thereof; and
a processor configured to process the composite signal by using a Rake receiver,
wherein the Rake receiver comprises:
a de-spreading code generator that outputs a de-spreading code;
a search correlator that receives the de-spreading code and the composite signal, and that calculates a correlation value between each of the first received signal and the delayed signal and the de-spreading code to output a plurality of delay time values according to the correlation value calculated for each of the first received signal and the delayed signal;
a plurality of delay elements that receive a corresponding one of the plurality of delay time values respectively and that receive the de-spreading code, each of the plurality of delay elements outputting the de-spreading code with the corresponding one of the plurality of delay time values;
a plurality of finger receivers that receive the composite signal and the de-spreading code with the corresponding one of the plurality of delay time values respectively; and
a combiner configured to combine outputs of the plurality of finger receivers into a single output signal,
wherein time values which correspond to time differences between the respective delay time values of the plurality of delay elements of the Rake receiver, are each less than the predetermined time value of the delay circuit.

27. A diversity circuit as claimed in claim 26, wherein the first antenna is tuned to a first frequency range and the second antenna is tuned to a second frequency range.

28. A diversity circuit as claimed in claim 26, wherein the combiner of the Rake receiver applies a weighting to the outputs of the plurality of finger receivers to provide a maximal-ratio-combined output.

29. A diversity circuit as claimed in claim 26, wherein the predetermined time value of the delay circuit is set such that a first plurality of peaks of the correlation between the first received signal and the de-spreading code due to multi-path delay, are not overlapped with a second plurality of peaks of the correlation between the delayed signal and the de-spreading code due to multi-path delay.

30. A diversity circuit as claimed in claim 26, wherein the search correlator outputs a first plurality of delay time values to the plurality of delay elements with respect to the first received signal and outputs a second plurality of delay time values to the plurality of delay elements with respect to the delayed signal, and wherein the first plurality of delay time values are different from the second plurality of delay time values.

31. A diversity circuit, comprising:
a first antenna configured to receive a radio frequency signal and to output a first received signal;
a second antenna configured to receive the radio frequency signal and to output a second received signal;
a first mixer connected to receive the first received signal and to down convert the first received signal to a first intermediate frequency signal;
a second mixer connected to receive the second received signal and to down convert the second received signal to a second intermediate frequency signal;
a delay circuit configured to delay the second intermediate signal by a predetermined delay time value and to provide a delayed signal as a result thereof;
a combiner configured to combine the first intermediate frequency signal with the delayed signal and to provide a composite signal as a result thereof; and
a processor configured to process the composite signal by using a Rake receiver
wherein the Rake receiver comprises:
a de-spreading code generator that outputs a de-spreading code;
a search correlator that receives the de-spreading code and the composite signal, and that calculates a correlation value between each of the first intermediate signal and the delayed signal and the de-spreading code to output a plurality of delay time values according to the correlation value calculated for each of the first intermediate signal and the delayed signal;
a plurality of delay elements that receive a corresponding one of the plurality of delay time values respectively and that receive the de-spreading code, each of the plurality of delay elements outputting the de-spreading code with the corresponding one of the plurality of delay time values;
a plurality of finger receivers that receive the composite signal and the de-spreading code with the corresponding one of the plurality of delay time values respectively; and
a combiner configured to combine outputs of the plurality of finger receivers into a single output signal, wherein time values which correspond to time differences between the respective delay time values of the plurality of delay elements of the Rake receiver, are each less than the predetermined time value of the delay circuit.

32. A diversity circuit as claimed in claim 31, further comprising a local oscillator coupled to the first and second mixers, wherein the local oscillator provides a constant frequency signal that is used by said first and second mixers to perform down conversion of the first and second received signals, respectively.

33. A communication apparatus, comprising:

a first receiving unit that receives a first signal;

a second receiving unit that receives a second signal;

a delay unit that delay the second signal by a predetermined time value to provide a delayed signal;

a combining unit that combines the first signal with the delayed signal to provide a composite signal; and a Rake receiver that receives the composite signal, wherein the Rake receiver comprises:

a de-spreading code generator that generates a de-spreading code;

a searcher unit that receives the composite signal and the de-spreading code, and to calculates a correlation between each of the first signal and the delayed signal and the de-spreading code to output a plurality of delay time values;

a plurality of delay elements that receives the de-spreading code and a corresponding one of the plurality of delay time values respectively, each of the plurality of delay elements outputting the de-spreading code which is delayed according to the corresponding one of the plurality of delay time values;

a plurality of finger units that receive the composite signal and the de-spreading code delayed according to the corresponding one of the plurality of delay time values respectively; and a combiner that combine outputs of the plurality of finger units into a single output signal, wherein the predetermined time value of the delay circuit is set such that a first plurality of peaks of the correlation between the first signal and the de-spreading code due to multi-path delay are not overlapped with a second plurality of peaks of the correlation between the delayed signal and the de-spreading code due to multi-path delay.

34. A communication apparatus as claimed in claim 33, wherein the searcher unit outputs a first plurality of delay time values to the plurality of delay elements with respect to the first signal and outputs a second plurality of delay time values to the plurality of delay elements with respect to the delayed signal, and the first plurality of delay time values are different from the second plurality of delay time values.

* * * * *